J. Hall.
Cotton Planter.
№ 18,393.   Patented Oct. 13, 1857.
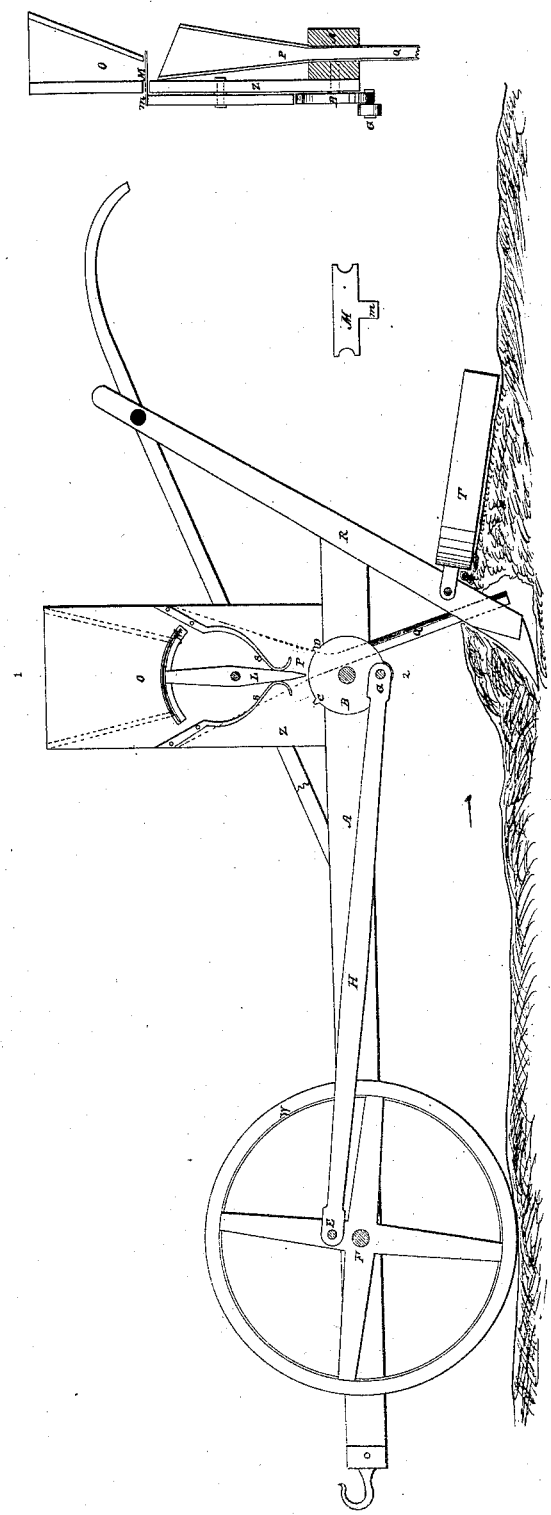

UNITED STATES PATENT OFFICE.

JOSEPH HALL, OF HONEY CUT, ALABAMA.

IMPROVEMENT IN SEED-PLANTERS.

Specification forming part of Letters Patent No. 18,393, dated October 13, 1857.

*To all whom it may concern:*

Be it known that I, JOSEPH HALL, of Honey Cut, in the county of Baldwin, State of Alabama, have invented a new and useful Improvement in Cotton and Corn Seed Planters; and I do hereby declare that the following is a full and exact description thereof, reference being had to the accompanying drawing, and to the letters of reference marked thereon.

The object of my invention is to make a plow to which a hopper containing the seed is attached, said hopper to have a sliding bottom, which, by means of certain levers and rods, receives its motion from the forward wheel which supports the plow-beam, the whole so arranged that when the plow is put in motion said sliding bottom of the hopper will at certain intervals allow a few corn or cotton seeds to drop through a tube which conducts the same to immediately behind the plowshare in such a manner that said seeds will be deposited certain distances apart in the furrow made by the plowshare, while a heavy mold-board attached to the stem levels the ridges of earth and covers the seed so planted.

To enable others skilled in the art to make and use my invention, I will proceed to describe its construction and operation.

I attach to the rear end of the beam A, immediately above the plowshare, a board, Z, of about two feet high, one foot wide, and one inch thick. On one side of this board are two hoppers, O and P, one above the other. The upper hopper, O, has a movable bottom, M, and the lower one terminates in a tube, Q, which pierces the beam A and the stem R and comes out at the rear of the plowshare. On the other side of the board is the lever L beveled on its lower end and carrying on its upper end the movable bottom M, which is attached to it by the projection $m$. The board has cut in it a curved slit for the free passage of said projection. Below the lever is a small wheel, B, having two cogs, C and D. On each side of the lever L is a spring, S, for the purpose of keeping the same in a vertical position. The connecting-rod H connects the crank-pin E on one of the spokes of the large wheel W with the crank-pin G of the small wheel D. The movable bottom M is made of iron and has the ends hollowed out, as shown in the drawing.

The apparatus works as follows: When the plow is put in motion the wheel W will, while revolving, give, by means of the connecting-rod H, an oscillating motion to the small wheel B. The cogs C and D pressing against the lower end of the lever L will cause the movable bottom M to slide past the lower part of the hopper O, and when pushed to its extreme end allow a few cotton or corn seeds to drop through its hollow ends until the cogs slipping past the end of the lever will cause the bottom of the hopper to close again by the action of the springs S S. The seed dropping in the lower hopper will be conducted by the tube and be deposited in the furrow made by the plowshare, while the heavy mold-board attached to the stem levels the ridges of earth formed each side of the furrow and covers up the seed. It is evident that one revolution of the wheel W causes the movable bottom to open four times. Thus in order to plant corn or cotton, say, eighteen inches apart the diameter of the wheel should be $\frac{1.5 \times 4}{3.14\ 1}=1.91$ or one foot and eleven inches. By changing the diameter of the wheel and the number of cogs on the small wheel the apparatus can be made to suit any kind of soil and deposit seed any distance apart.

I am aware that a great many seed-planting plows have been brought into use, and I lay no claim to the originality of the principle of planting seed by a mechanical process; but What I do claim, and desire to secure by Letters Patent, is—

The lever L, carrying a movable bottom, M, on its upper end, in combination with the springs S and wheel B, the whole arranged in the manner and for the purpose herein set forth.

JOSEPH HALL.

Witnesses:
 CHARLES S. LIERNUR.
 JNO. HALL.